United States Patent [19]

Koppel et al.

[11] Patent Number: 4,896,017

[45] Date of Patent: Jan. 23, 1990

[54] ANODE FOR A PLASMA ARC TORCH

[75] Inventors: Lewis M. Koppel, Amherst; Jonathan J. Kim, Williamsville; Viswanathan Venksteswaran, Amherst, all of N.Y.

[73] Assignee: The Carborundum Company, Cleveland, Ohio

[21] Appl. No.: 268,119

[22] Filed: Nov. 7, 1988

[51] Int. Cl.[4] .................... B23K 9/00

[52] U.S. Cl. .................... 219/121.52; 219/121.48; 219/121.5

[58] Field of Search .................... 219/121.48, 121.49, 219/121.50, 121.51, 121.52, 74, 75, 121.39; 313/231.31, 231.41, 231.51

[56] References Cited

U.S. PATENT DOCUMENTS

| | | | |
|---|---|---|---|
| 3,450,926 | 6/1969 | Kiernan | 219/121.52 |
| 3,770,935 | 11/1973 | Tatero et al. | 219/121.52 |
| 3,862,393 | 1/1975 | Dundas et al. | 219/121 P |
| 4,140,892 | 2/1979 | Muller | 219/121.52 |
| 4,570,048 | 2/1986 | Poole | 219/121 PP |
| 4,587,397 | 5/1986 | Camacho et al. | 219/121.52 |
| 4,656,330 | 4/1987 | Poole | 219/121.51 |
| 4,661,682 | 4/1987 | Gruner et al. | 219/121.52 |

*Primary Examiner*—M. H. Paschall

*Attorney, Agent, or Firm*—George W. Moxon, II; Joseph G. Curatolo; Larry W. Evans

[57] ABSTRACT

An anode for plasma torch that has a primary section and a secondary section with a gradual transition between the sections. The diameter of the hollow primary section tapers down toward a transition zone, at which point the anode formed by the sections makes a gradual transition to the secondary section. The secondary section is cylindrical and has a diameter larger than that of the primary section from which the plasma exists the anode. The transition zone will describe a generally conical surface and may include a convex radius on the neck where the primary and transition sections meet.

4 Claims, 1 Drawing Sheet

ANODE FOR A PLASMA ARC TORCH

BACKGROUND OF THE INVENTION

The present invention relates to a plasma arc torch or heat source, and more particularly to the anode of the torch.

In the metals and ceramic processing industries, high temperatures are needed for various tasks and processes such as continuous casting, sintering and welding. One method of producing the high temperatures required for these processes is through the use of a plasma arc torch.

The plasma arc torch operates by creating an intense electromagnetic field which ionizes a gas medium to form a discharge, or thermal plasma. An electric arc is struck between a pair of electrodes to heat a working gas. The gas extends the arc and it is heated by the arc such that it becomes ionized and disassociated to form the plasma. The thermal plasma may have an operating temperature range of from 2000° to 11000° K. Torches can operate in a so-called transferred mode, wherein the arc and plasma jet extend from a nozzle to the workpiece being heated, or in a so-called non-transferred mode, in which case the arc impinges the wall of the nozzle which functions as an anode and only the plasma effluent is projected as a jet beyond the nozzle toward the workpiece or wherever one wishes to direct the flow of plasma. The basic operation of torches of this type are described in U.S. Pat. No. 2,960,594. Another example of a plasma arc torch is disclosed in U.S. Pat. No. 4,570,048 to Poole, the teachings of which are incorporated herein by reference.

To control the operation of the torch, it is necessary to regulate both the flow of the gas medium through the torch and the supply of electric power to the torch. The geometry of the anode, which also serves as the nozzle through which the gas flows and the plasma arc extends, has been found in prior art devices to provide a further means of controlling the operation of the torch. If the nozzle allows the plasma arc to wander, unstable operation of the torch results, regardless of the regulation of the gas flow or the electric power supply.

Unstable operation of the plasma torch will complicate application of the torch to a workpiece and result in damage to the nozzle in the form of erosion of the electrodes. Erosion necessitates frequent replacement of the electrodes which reduces the time that the torch can be used and increases the time required for maintenance. Additionally, many devices of the prior art operate their torches efficiently only in a narrow range of gas flows and power supplies. The Poole design (U.S. Pat. No. 4,570,048) presented a torch that operated over a range of operating conditions, but required an anode design with a sharp knife edge transition.

Thus, there is a need for improvements in or alternatives to the existing plasma arc torches and anode designs which will allow for operations at high thermal efficiencies and different heating requirements.

Accordingly, it is an object of the present invention to provide a plasma torch having an improved anode design.

It is another object of the present invention to provide applasma torch that operates at a high thermal efficiency.

SUMMARY OF THE INVENTION

These and other objects of the present invention are met by providing an anode for a plasma torch that has a primary section and a secondary section with a gradual transition between the sections. In this geometry, the hollow primary section is generally conical and the diameter tapers down toward the transition zone, at which point the anode formed by the sections makes a gradual transition to the secondary section. The secondary section comprises a cylindrical shape having a diameter larger than that of the primary section and is the the section which the plasma exits the torch.

Although the focus of this invention will be on the anode design, it will be appreciated that the electric arc torch does include an insulating housing which supports a cathode section and an anode section which together define an arc passageway which extends within the housing to one end thereof. The cathode and anode structures and the housing define water jackets so that cooling water can be circulated through the torc and brought into intimate heat exchange contact with those electrodes in order to prevent those parts from overheating when the torch is in operation. The materials of construction are known in the art, with copper being a preferred anode material. The cathode can be a well-type cathode with the electron emitting component of the cathode being located at the bottom of the well, although other cathode designs are acceptable. In addition, there is a working gas source which first enters the anode at the primary section. Thus, when electric current is applied across the cathode and the anode, an arc is formed which ionizes the working gas to form a thermal plasma arc. The thermal plasma arc exits the plasma torch through the secondary section and the hot gases may then be used for various applications.

Generally, applicants have discovered that the transition between the anode sections does not have to be sharp. By that, applicants mean that the edge need not be a knife edge and the angle which defines the transition can be less than 270°. In the present invention, the transition zone is formed by a slope or bevel at the neck where the primary and secondary sections meet. The bevel forms a face which describes a shape which is generally conical and intersects the cylinder forming the secondary section. Further, the point where the primary anode and the transition zone meet can form a rounded edge, such as a convex shape toward the axis of the anode. In any embodiment of the present invention, the geometry of the sections in combination with the transition zone provides a stable plasma arc which stretches from the cathode to an exit point at the secondary section.

The present invention is further described in the following description of the preferred embodiments taken together with the drawing, in which like reference numbers refer to like members in the various figures.

DESCRIPTION OF THE PREFERRED EMBODIMENTS

Figure 1:
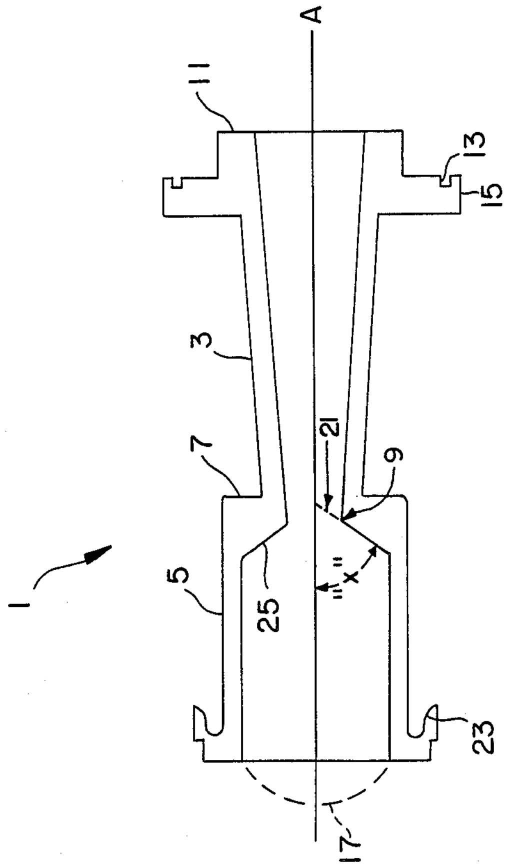
FIG. 1 is a cross-sectional view of the plasma torch anode of the present invention.

The description hereinafter will be directed primarily to the anode section of the plasma arc torch. So, for a full description of the torch including the cathode section, insulating body, etc. reference should be made to U.S. Pat. No. 4,570,048 which has been incorporated herein by reference. Briefly, though, the cathode and anode sections as well as the housing are each composed of a plurality of annular components or parts which, when assembled, define passageways for supplying a gas to the torch to stabilize and lengthen the arc established between its electrodes and for circulating water through the torch to cool its various parts, particularly the electrodes.

The plasma torch anode 1 of the present invention as shown in the drawing is a generally cylindrical annulus which has a primary section 3 and a secondary section 5. The two sections are a generally conical shape and a generally cylindrical shape, respectively, and are positioned consecutively and communicatively along an axis "A". The sections are joined together to form a monolithic body in the torch 1.

The primary section 3 is a hollow cone having, preferably, a constant wall thickness, although it is not intended to limit the invention to constant wall thickness since that feature is not critical to the invention. The primary section spans from its largest diameter near a base 11 to its smallest diameter at a transition zone 7 located between the primary section 3 and the secondary section 5. The base 11 provides the means for joining the plasma torch 1 to a working gas supply (not shown) and to a cathode (not shown). An O ring groove 13 and an O ring surface 15 are provided in the base 11 to seal the working gas within the anode 1. Although an O ring seal is illustrated, other seal means are possible and can be used. The groove 13 allows for setting an O ring within it to prevent gas from escaping in the radial direction while using an O ring on the surface 15 prevents gas from escaping in the axial direction. The omitted details are shown in the above referenced U.S. Pat. No. 4,570,048. It should be noted that nitrogen gas is the preferred working gas, but that other gases such as argon or the like known to those skilled in the art may be used.

The secondary section 5 is substantially a hollow cylinder of, preferably, constant wall thickness, but other shape wall thickness secondary sections could be employed. The secondary section 5 extends from the transition zone 7 to the point at which the plasma arc 17 extends from the anode 1.

At the transition zone 7, the diameter of the primary section 3 is significantly smaller than the diameter of the secondary section 5. The transition zone 7 comprises an area in which the primary section 3 is joined with the secondary section 5. The design of the transition zone 7 of the present invention is shown in FIG. 1.

As shown, the transition zone 7 consists of a face 25, which intersects the inside surfaces of the primary section 3 and the secondary section 5. The angle "X", which is the measure of the angle between dotted line projection 21 from face 25 to axis "A", will range from about 5 degrees to about 85 degrees with the range of 10 degrees to 80 degrees being preferred. The exaol angle will depend upon the exaot size of the anode and upon the efficiency of the torch, although a preferred angle is about 60 degrees, with the range of about 55 degrees to about 65 degrees also being preferred. In another aspect of the present invention, the radius 9 is convex toward axis "A" and establishes a smooth communication between the inside surface of the primary section 3 and face 25. The precise curvature is not critical, since the present invention does not depend upon this point being a sharp or knife edge transition.

With any embodiment of the present invention, the working gas (not shown) enters the primary section 3 at the end of the anode nearest the base 11. A plasma arc is formed by the gas passing through the arc created at the cathode (not shown) located at the base 11 which then passes through the primary section 3 of the anode 1. The plasma and the working gas accelerate as they move toward the secondary section 5, due to the converging geometry of the primary section 3. At the transition zone 7, the plasma arc gradually spreads out within the larger diameter secondary section 5 of the anode 1. Due to the described geometries of the transition zone 7 and the sections 3 and 5, a stable plasma arc 17 is formed which stretches from the cathode to its exit from the anode 1 at the secondary section 5.

The exact dimensions for the anode 1 for a plasma torch are not critical as long as they provide the functionality desired. As was discovered from the operation of a torch in accordance with the present invention, the angle of transition face 25 can range from nearly perpendicular to axis "A" (about 85 degrees) to about 5 degrees. This range will provide a gradual transition zone which helps the gases flowing from primary anode 3 to flow down the middle of and away from the walls of secondary anode 5. This allows the arc 17 to be carried outside of secondary anode 5, without striking the inside walls of anode 5, where the arc 17 connects with the free end 23 of secondary anode 5 when the torch is operated in its non-transferred mode. This continues in a rotating fashion due to the flow of the gas and produces a plasma jet which extends from the end 23 of the torch. The dimensions described below are for an illustrative example and in no way are intended to limit the scope of the invention as claimed.

EXAMPLE

A torch was assembled having an anode with overall length of about 4 5/16 inches, with the primary section 3 being about 2 inches long, and the length of the secondary section 5 being approximately 2 inches. The inside diameter of the base 11 was about $\frac{3}{4}$ inches, while the inside diameter at the end of the primary section 3 joined to the transition zone 7 was approximately $\frac{3}{8}$ inch in diameter, and the inside diameter of the secondary section 5 had a size of about 1 inch. Lengths and diameters greater or lesser than the values noted above may be utilized in a particular embodiment of the present invention, depending upon such variables as the material used to form the plasma arc torch 1, the type of working gas used, the size of arc 17 desired, and the dimensions of the outlet to which the base 11 is connected. In general, those with skill in the art will be able to dimensionally alter the above-described anode 1 and still produce an anode for a plasma arc torch according to the present invention.

Next, using the anode constructed using the dimensions discussed above, a plasma arc torch was operated and the thermal efficiencies listed in Table I and Table II were achieved. In the tests, the voltage, current and power were all measured separately. Table I charts the thermal efficiency yielded for a plasma torch using the anode 1 as shown in FIG. 1 where surface 25 was generally perpendicular to and radius 9 was round or convex toward axis "A". Table II charts the efficiency for a plasma torch using the anode 1 as shown in FIG. 1, wherein the angle "X" was about 56 degrees. The torches in accordance with the present invention were operated at constant, approximately 3000 BTU/lb, gas enthalpy for each of three power levels of 25, 40 and 55 kW. The torches were allowed to operate for a sufficient time to allow the temperature change of the cooling water to reach steady state. Table III extracts similar data from FIGS. 4 and 6 in U.S. Pat. No. 4,570,048 for comparison, but in those examples the power, gas flows and enthalpies varied.

TABLE 1

| No. | Volts | Amps | Power kW | Gas Flow SCFM | Thermal Efficiency % | Enthalpy BTU/LB. |
|---|---|---|---|---|---|---|
| 1 | 280 | 100 | 25.5 | 5.15 | .7866 | 3052 |
| 2 | 285 | 158 | 40.0 | 7.57 | .7610 | 3151 |
| 3 | 295 | 198 | 55.0 | 10.67 | .7590 | 3065 |

TABLE 2

| No. | Volts | Amps | Power kW | Gas Flow SCFM | Thermal Efficiency % | Enthalpy BTU/LB. |
|---|---|---|---|---|---|---|
| 1 | 285 | 95 | 25.0 | 5.50 | .7965 | 2837 |
| 2 | 300 | 145 | 40.11 | 8.45 | .7740 | 2879 |
| 3 | 317 | 185 | 54.57 | 10.50 | .7720 | 3143 |

TABLE 3

| No. | Volts | Current Amps | Power kW | Gas Flow SCFM | Thermal Efficiency | Enthalpy BTU/LB. |
|---|---|---|---|---|---|---|
| E | 245 | 100 | 24.5 | 5.75 | .776 | 2577 |
| G | 249 | 151 | 37.6 | 5.75 | .746 | 3803 |
| I | 248 | 151 | 37.45 | 8.45 | .737 | 2543 |
| J | 253 | 175 | 44.28 | 8.45 | .730 | 2981 |
| K | 261 | 200 | 52.2 | 8.45 | .735 | 3538 |
| N | 266 | 200 | 53.2 | 11.82 | .728 | 2553 |

As can be seen from a comparison of the data in Table 1 or 2 against that in Table 3, the anode of the present invention can achieve similar to and generally better efficiencies, at similar enthalpies and gas flow rates as compared to the design in U.S. Pat. No. 4,570,048.

The embodiments which have been described above are ways to utilize this invention and are set out here by way of illustration but not of limitation. Many other embodiments which will be readily apparent to those skilled in the art may be made without materially departing from the spirit and scope of this invention.

What is claimed is:

1. An anode which functions as a nozzle and produces a directable flow of thermal plasma for a plasma arc torch that operates at a high thermal efficiency, comprising a generally cylindrical shape having an axial bore with two consecutively aligned sections, aligned along a major axis of the cylinder, including:

a base means hollowed along the major axis for joining the anode to the plasma arc torch and to a gas source and;

a primary section, having an inside surface which is aligned along said axis and conically shaped with the end having the larger inside diameter being attached to the base and an opposite end having a smaller inside diameter;

a transition zone at the end of the primary section having a smaller inside diameter comprising a conically shaped inside surface, which surface is at an angle of between about 55 degrees to about 65 degrees relative to said major axis, and wherein the end of the transition zone having a smaller diameter is attached to the end of the primary section having a smaller diameter and wherein the point where the primary section and transition zone are joined is rounded and convex toward the axis of the anode and the end of the transition zone having a larger diameter is attached to one end of the secondary section; and a secondary section, having an inside surface which is cylindrically shaped and aligned along the axis, and wherein the secondary section is attached at one end to the transition zone.

2. The anode for a plasma arc torch according to claim 1 wherein the inside surface of said transition zone is at an angle relative to said axis of about 60 degrees.

3. The anode for a plasma arc torch according to claim 1 wherein the base further comprises means for connecting the base to an outlet of a working gas source.

4. The anode for a plasma arc torch according to claim 3 wherein the means for mounting the base to an outlet of a working gas source includes an O ring groove in a surface perpendicular to the central axis and an O ring surface concentric with the central axis.

* * * * *